Patented Apr. 23, 1946

2,399,082

UNITED STATES PATENT OFFICE 2,399,082

HIGH DIELECTRIC MATERIAL AND METHOD OF MAKING SAME

Eugene Wainer, Niagara Falls, N. Y., assignor to The Titanium Alloy Manufacturing Company, New York, N. Y., a corporation of Maine No Drawing. Original application June 11, 1943, Serial No. 490,485. Divided and this application June 21, 1944, Serial No. 541,474

4 Claims. (Cl. 106—39)

The present invention relates to ceramic dielectric materials and to methods of making the same. More particularly, the invention relates to such materials in which compounds of titania as the predominating constituent are used in combination with compounds of tin.

This is a division of Serial No. 490,485, filed June 11, 1943. In copending applications for patent, Ser. No. 465,387, filed November 12, 1942, and Ser. No. 482,613, filed April 10, 1943, the useful properties of barium titanate-strontium titanate mixtures are described. The present invention relates to another group of bodies whose usefulness is equally widespread, in that this group of ceramic compositions has properties such as to make them useful as capacitors in radio, television and communications generally, as capacitative temperature compensating devices in receivers and communication equipment to prevent distortions due to changes in circuit characteristics caused by temperature changes. The dielectric constants of some of these compositions are so high that their utilization in low frequency distribution and communication systems such as 60 cycle lines, by means of capacitative coupling between a low frequency (20 to 120 cycle) high tension transmission line and communication telephone line, is made possible.

Further, the very high dielectric constants of the ceramic composition of the present invention make possible the use of these materials as electro-mechanical devices, for example the transfer of mechanical energy or motion into electrical energy or vice versa, in a fashion similar to the action exhibited by piezo electric crystals. Thus my novel compositions have possible utility in piezoelectricity, supersonics, crystal or condenser microphones, frequency stabilizers, loud speakers, phonograph pick ups, telephone design, and oscillator designs generally. The foregoing remarks apply particularly to those bodies whose dielectric constants are over 1000 at radio frequency. In condenser microphones, very thin sheets of the higher dielectric constant materials are rigidly clamped at either the center or edges and used as the vibrating diaphragm. The minute changes of position or dimension of the dielectric due to vibration will occasion relatively large changes in capacity by means of which sound is transformed into electrical energy.

Other members of this group, particularly those having dielectric constants over 1000 exhibit electrical and mechanical characteristics of the same nature as piezo electrical and pyroelectrical crystals. For example, a rod of the material having one end fixed and one end free to vibrate will when in vibration, develop a potential difference of several volts between the two ends of the rod.

The particular usefulness of members of this group as compensators for correction of frequency drift, lies not only in the possibility of obtention of both positive and negative temperature coefficients of a wide variety, but also the possibility of controlling the degree of variation through choice of the proper composition. These properties, coupled with extremely low power factors in some cases, afford a high degree of usefulness for this latter class of application.

In general, the novel compositions of the present invention comprise fired mixtures of the titanates and stannates of the alkaline earth metals. In a broad sense these mixtures may consist of one or more titanates with one or more stannates. While the alkaline earth metal compounds generally are of utility in the present invention, those of particular importance are the stannates and titanates of barium, strontium and calcium. In general the total stannate content of the ceramic body will not exceed 50%. The general classes of compositions covered by this invention are indicated in the examples. The peculiarly beneficial effect of the stannate additions is most strikingly shown in the case of such additions to barium titanate. At radio frequencies barium titanate has a dielectric constant of 1200–1300, and a temperature coefficient which is first negative, then strongly positive, and finally strongly negative between 20° C. and 150° C. Not only may this erratic behavior be eliminated by addition of the stannates but dielectric constants at least as high as 13,000 at radio frequencies are possible.

In the practice of the invention the ingredients as indicated in the table below are properly reacted ceramically and then ground so that the coarsest particles will pass a 325 mesh screen. The dried powders are then mixed within the limits indicated by the proportions given in the table. Approximately 10% water is added and thoroughly mixed in and the damp powder granulated by passage through a 20 mesh screen. The granules are then pressed in a die under a pressure of 5 to 10 tons per square inch, and then allowed to air dry for 24 hours. The pieces used for purposes of test were roughly 1 inch in diameter and 0.1 inch thick. Pieces of such size were fired on a schedule of 400° F. per hour to the peak temperature, then held at peak temperature for three hours and then allowed to cool. The maturation temperature for all the bodies listed below is between 2450° and 2500° F. After cooling the opposing parallel surfaces are painted with silver powder paste which is fixed as a silver electrode by firing to 1500° F.

The values obtained below were determined at one megacycle using a radio frequency bridge of standard design. Resistivity was determined on a high sensitivity resistance circuit on which a resistance of a million megohms could easily be detected, the zero point indicator being a galvanometer. The 1000 cycle measurements were obtained through use of an impedance bridge of standard design, whose arms were resistive components.

Having described the method of practice of the invention, the following sets of tables indicate the type of compositions and the values obtained thereon.

The peculiar advantage of such compositions as capacitor materials for by-pass and filter condensers may be seen from perusal of the following figures. For example, present day electrolytic condensers at best have power factors between 6.0% and 16.0% whereas all the values in the table are below 3.0%. Thus such materials may be used as substitutes for paper and electrolytics. Bodies having power factors below 0.1% are suitable as substitutes for mica capacitors. The possibility of variation and control of temperature coefficients, thus making available these compositions as compensator compositions, is indicated from the data given in Table V and following. These temperature coefficients were measured at one megacycle.

Table I.—CaTiO₃ series

| Comp. No. | CaTiO₃-stannate | One megacycle | | One kilocycle | |
|---|---|---|---|---|---|
| | | Dielec. constant | Power factor, percent | Dielec. constant | Power factor, percent |
| 1 | 100+1BaSnO₃ | 162 | 0.010 | 171 | 1.3 |
| 2 | 100+5BaSnO₃ | 158 | 0.010 | 165 | 1.3 |
| 3 | 100+10BaSnO₃ | 148 | 0.010 | 161 | 1.3 |
| 4 | 80+20BaSnO₃ | 131 | 0.010 | 139 | 1.2 |
| 5 | 65+35BaSnO₃ | 142 | 0.015 | 149 | 1.3 |
| 6 | 50+50BaSnO₃ | 133 | 0.015 | 140 | 1.4 |
| 7 | 100+1SrSnO₃ | 145 | 0.010 | 155 | 1.4 |
| 8 | 100+5SrSnO₃ | 133 | 0.010 | 148 | 1.4 |
| 9 | 100+10SrSnO₃ | 132 | 0.010 | 137 | 1.4 |
| 10 | 80+20SrSnO₃ | 107 | 0.010 | 123 | 1.4 |
| 11 | 65+35SrSnO₃ | 77 | 0.010 | 86 | 1.7 |
| 12 | 50+50SrSnO₃ | 57 | 0.030 | 78 | 2.5 |
| 13 | 100+1CaSnO₃ | 150 | 0.010 | 157 | 1.4 |
| 14 | 100+5CaSnO₃ | 145 | 0.010 | 153 | 1.3 |
| 15 | 100+10CaSnO₃ | 132 | 0.010 | 142 | 1.4 |
| 16 | 80+20CaSnO₃ | 103 | 0.010 | 117 | 1.4 |
| 17 | 65+35CaSnO₃ | 76 | 0.010 | 85 | 2.1 |
| 18 | 50+50CaSnO₃ | 61 | 0.010 | 72 | 1.8 |

Table II.—SrTiO₃ series

| Comp. No. | SrTiO₃-stannate | One megacycle | | One kilocycle | |
|---|---|---|---|---|---|
| | | Dielec. constant | Power factor, percent | Dielec. constant | Power factor, percent |
| 1 | 100+1BaSnO₃ | 249 | 0.010 | 260 | 1.1 |
| 2 | 100+5BaSnO₃ | 247 | 0.010 | 240 | 1.0 |
| 3 | 100+10BaSnO₃ | 210 | 0.010 | 220 | 1.7 |
| 4 | 80+20BaSnO₃ | 233 | 0.040 | 237 | 1.2 |
| 5 | 65+35BaSnO₃ | 155 | 0.040 | 163 | 1.9 |
| 6 | 50+50BaSnO₃ | 99 | 0.030 | 97 | 1.6 |
| 7 | 100+1SrSnO₃ | 242 | 0.040 | 244 | 1.2 |
| 8 | 100+5SrSnO₃ | 227 | 0.060 | 238 | 1.2 |
| 9 | 100+10SrSnO₃ | 213 | 0.080 | 217 | 1.2 |
| 10 | 80+20SrSnO₃ | 144 | 0.010 | 149 | 1.7 |
| 11 | 65+35SrSnO₃ | 76 | 0.010 | 84 | 2.0 |
| 12 | 50+50SrSnO₃ | 45 | 0.030 | 52 | 8.0 |
| 13 | 100+1CaSnO₃ | 247 | 0.030 | 261 | 1.1 |
| 14 | 100+5CaSnO₃ | 237 | 0.040 | 244 | 1.1 |
| 15 | 100+10CaSnO₃ | 208 | 0.020 | 214 | 1.1 |
| 16 | 80+20CaSnO₃ | 141 | 0.010 | 146 | 1.3 |
| 17 | 65+35CaSnO₃ | 97 | 0.010 | 108 | 2.6 |
| 18 | 50+50CaSnO₃ | 75 | 0.010 | 85 | 1.6 |

Table III.—BaTiO₃ series

| Comp. No. | BaTiO₃-stannate | One megacycle | | One kilocycle | |
|---|---|---|---|---|---|
| | | Dielec. constant | Power factor, percent | Dielec. constant | Power factor, percent |
| 1 | 100+1BaSnO₃ | 1,525 | 0.820 | 1,590 | 1.0 |
| 2 | 100+5BaSnO₃ | 2,010 | 1.190 | 2,155 | 1.6 |
| 3 | 100+10BaSnO₃ | 3,580 | 2.730 | 3,970 | 1.4 |
| 4 | 80+20BaSnO₃ | 4,175 | 0.870 | 4,275 | 0.01 |
| 5 | 65+35BaSnO₃ | 679 | 0.420 | 683 | 0.03 |
| 6 | 50+50BaSnO₃ | 263 | 0.260 | 280 | 2.8 |
| 7 | 100+1SrSnO₃ | 1,650 | 0.950 | 1,730 | 1.1 |
| 8 | 100+5SrSnO₃ | 2,300 | 1.500 | 2,470 | 1.8 |
| 9 | 100+10SrSnO₃ | 4,300 | 0.980 | 4,780 | 2.4 |
| 10 | 80+20SrSnO₃ | 1,720 | 0.320 | 1,735 | 0.01 |
| 11 | 65+35SrSnO₃ | 593 | 0.230 | 605 | 0.06 |
| 12 | 50+50SrSnO₃ | 272 | 0.180 | 276 | 1.6 |
| 13 | 100+1CaSnO₃ | 1,710 | 1.100 | 1,790 | 1.4 |
| 14 | 100+5CaSnO₃ | 2,680 | 2.000 | 2,840 | 1.8 |
| 15 | 100+10CaSnO₃ | 8,500 | 2.500 | 9,400 | 1.5 |
| 16 | 80+20CaSnO₃ | 1,420 | 0.320 | 1,445 | 0.02 |
| 17 | 65+35CaSnO₃ | 235 | 0.060 | 238 | 1.1 |
| 18 | 50+50CaSnO₃ | 124 | 0.010 | 130 | 1.4 |
| 19 | 92+8BaSnO₃ | 2,810 | 2.620 | 3,290 | 2.0 |
| 20 | 88+12BaSnO₃ | 6,575 | 2.720 | 7,060 | 1.2 |
| 21 | 86+14BaSnO₃ | 9,450 | 2.900 | 10,200 | 0.8 |
| 22 | 84+16BaSnO₃ | 12,600 | 2.200 | 13,100 | 0.4 |
| 23 | 82+18BaSnO₃ | 7,550 | 1.090 | 7,250 | 0.1 |

Table IV.—Complex series

| Comp. No. | Composition | One megacycle | | One kilocycle | |
|---|---|---|---|---|---|
| | | Dielec. constant | Power factor, percent | Dielec. constant | Power factor, percent |
| 1 | 80BaTiO₃, 10BaSnO₃, 10SrSnO₃ | 4,160 | 0.95 | 3,510 | 0.01 |
| 2 | 70BaTiO₃, 20BaSnO₃, 10SrSnO₃ | 1,460 | 0.38 | 1,415 | 0.01 |
| 3 | 70BaTiO₃, 10BaSnO₃, 20SrSnO₃ | 2,105 | 0.50 | 1,805 | 0.02 |
| 4 | 70BaTiO₃, 15BaSnO₃, 15SrSnO₃ | 1,475 | 0.31 | 1,450 | 0.10 |
| 5 | 85BaTiO₃, 5BaSnO₃, 5SrSnO₃, 5SrTiO₃ | 7,720 | 1.74 | 8,100 | 0.50 |
| 6 | 70BaTiO₃, 10BaSnO₃, 10SrSnO₃, 10SrTiO₃ | 1,350 | 0.23 | 1,320 | 0.20 |
| 7 | 55BaTiO₃, 15BaSnO₃, 15SrSnO₃, 15SrTiO₃ | 615 | 0.16 | 625 | 1.30 |

Table V.—Temperature capacity data

| Temperature, °C. | Body #3, CaTiO₃ series K | Body #9, CaTiO₃ series K | Body #15, CaTiO₃ series K |
|---|---|---|---|
| 20 | 148 | 137 | 132 |
| 30 | 148 | 137 | 132 |
| 40 | 148 | 136 | 131 |
| 50 | 147 | 136 | 131 |
| 60 | 146 | 135 | 130 |
| 70 | 146 | 134 | 129 |
| 80 | 145 | 134 | 128 |
| 90 | 144 | 133 | 128 |
| 100 | 143 | 132 | 127 |
| 110 | 141 | 131 | 126 |
| 120 | 140 | 129 | 125 |
| 130 | 139 | 128 | 124 |
| 140 | 138 | 127 | 123 |
| 150 | 137 | 126 | 122 |

Table VI.—Temperature capacity data

| Temperature, °C. | Body #3, SrTiO₃ series K | Body #9, SrTiO₃ series K | Body #15, SrTiO₃ series K |
|---|---|---|---|
| 20 | 210 | 215 | 208 |
| 30 | 210 | 215 | 208 |
| 40 | 208 | 215 | 207 |
| 50 | 207 | 213 | 206 |
| 60 | 205 | 212 | 205 |
| 70 | 203 | 210 | 203 |
| 80 | 201 | 208 | 202 |
| 90 | 198 | 206 | 199 |
| 100 | 196 | 206 | 197 |
| 110 | 193 | 204 | 194 |
| 120 | 189 | 202 | 191 |
| 130 | 186 | 200 | 188 |
| 140 | 184 | 198 | 184 |
| 150 | 180 | 196 | 182 |

*Table VII.—Temperature capacity series*

| Temperature, °C. | Body #3, BaTiO₃ series K | Body #9, BaTiO₃ series K | Body #15, BaTiO₃ series K | Body #5, complex series K |
|---|---|---|---|---|
| 20 | 3,580 | 4,300 | 8,500 | 7,720 |
| 30 | 3,780 | 4,300 | 8,600 | 7,500 |
| 40 | 4,020 | 4,270 | 8,940 | 7,400 |
| 50 | 4,330 | 4,250 | 9,170 | 7,260 |
| 60 | 4,780 | 4,180 | 9,480 | 6,650 |
| 70 | 5,350 | 4,120 | 9,170 | 5,900 |
| 80 | 6,200 | 4,030 | 8,640 | 4,960 |
| 90 | 6,810 | 3,940 | 6,640 | 4,210 |
| 100 | 7,220 | 3,900 | 5,460 | 3,930 |
| 110 | 8,180 | 3,800 | 4,260 | 2,920 |
| 120 | 8,860 | 3,540 | 3,530 | 2,380 |
| 130 | 8,950 | 3,120 | 2,830 | 1,940 |
| 140 | 8,260 | 2,640 | 2,290 | 1,600 |
| 150 | 7,520 | 2,210 | 2,000 | 1,470 |

The temperature coefficients of the compositions covered in Tables V, VI and VII are indicative of the scope of variation possible. While single compositions may yield the desired coefficient, an infinite variety of coefficient is possible through parallel combination of one or more bodies.

From the foregoing it will be seen that the present invention provides compositions eminently suitable as dielectric materials in a wide variety of uses. The above examples have been set forth as illustrative of the invention, the scope thereof being comprehended within the appended claims as it will be apparent that wide variation may be had from the specific examples.

What is claimed is:

1. A ceramic composition which comprises strontium titanate and an alkaline earth stannate.

2. A ceramic composition which comprises strontium titanate and calcium stannate.

3. A ceramic composition which comprises strontium titanate and strontium stannate.

4. A ceramic compostion which comprises strontium titanate and barium stannate.

EUGENE WAINER.